United States Patent [19]
Fujiki et al.

[11] 4,073,359
[45] Feb. 14, 1978

[54] BRAKING SYSTEM FOR AVOIDING A COLLISION OF A VEHICLE WITH AN OBSTACLE THEREOF

[75] Inventors: Norio Fujiki, Yokohama; Hiroshi Endo, Yokosuka, both of Japan

[73] Assignee: Nissan Motor Company, Limited, Japan

[21] Appl. No.: 747,475

[22] Filed: Dec. 6, 1976

[30] Foreign Application Priority Data

Dec. 8, 1975  Japan .................... 50-144954

[51] Int. Cl.$^2$ .............................. B60T 7/12
[52] U.S. Cl. .................... 180/98; 303/100; 340/53; 343/7 VM
[58] Field of Search .......... 180/98; 188/181; 246/187 C; 303/20, 91, 100, 106, 109; 340/53, 62; 343/7 VC, 7 VM, 112 CA

[56] References Cited

U.S. PATENT DOCUMENTS

| 2,851,120 | 9/1958 | Fogiel | 343/7 VM X |
| 3,420,572 | 1/1969 | Bisland | 343/7 VM X |
| 3,689,882 | 9/1972 | Dessailly | 343/7 VM X |
| 3,898,652 | 8/1975 | Rashid | 343/7 VM X |
| 3,978,481 | 8/1976 | Anewin et al. | 343/7 VM |

FOREIGN PATENT DOCUMENTS 2,513,517  10/1975  Germany ............ 343/7 VM

*Primary Examiner*—Stephen G. Kunin
*Attorney, Agent, or Firm*—Robert E. Burns; Emmanuel J. Lobato; Bruce L. Adams

[57] ABSTRACT

A radar sensor and a vehicle velocity sensor are mounted on a vehicle, producing three signals representative of, vehicle velocity, a distance and a relative velocity between the vehicle and an obstacle ahead thereof. These three signals are fed to a collision imminence computing circuit which generates two signals representative of collision imminences depending upon whether the obstacle is stationary or moving.

5 Claims, 3 Drawing Figures

BRAKING SYSTEM FOR AVOIDING A COLLISION OF A VEHICLE WITH AN OBSTACLE THEREOF

BACKGROUND OF THE INVENTION

This invention relates generally to a braking system for avoiding a collision of a vehicle with an obstacle ahead thereof, and particularly to such a system for automatically or manually activating a braking actuator in response to a stationary and/or a moving obstacle ahead of the vehicle.

Several braking systems have been proposed each of which is equipped with a radar sensor for sensing an obstacle ahead of the vehicle in order to automatically or semi-automatically activate a braking actuator. According to one of the conventional type of the braking systems, a radar sensor, making use of, for example, a doppler effect, senses two variables, which are a distance and a relative velocity between the vehicle and the obstacle. The conventional system then generates a signal representing a collision imminence with an obstacle if the following formula is satisfied: $2\alpha R \leq V_R^2$ where R: the distance between the vehicle and the obstacle, $V_R$: the relative velocity between the vehicle and the obstacle, and $\alpha$: the deceleration of the vehicle. The signal thus generated is fed to a suitable alerting device for alerting the vehicle driver of the imminence of a collision, and/or fed to a brake actuator driving circuit in order to automatically activate a brake actuator.

However, one major problem of the conventional systems is that the system can not determine whether or not the sensed obstacle is stationary or moving, because the sensed variables, that is, the distance and the relative velocity between the vehicle and the obstacle never serve to discriminate between the two conditions. As a result, the vehicle can not be properly braked based on the obtained information in that a collision imminence in the case where the sensed obstacle is stationary is different from that in the case where the sensed obstacle is moving (for example, a preceding vehicle). Therefore, it is often the case that travelling vehicles are unnecessarily spaced with the result of an increase of traffic jams, and the travelling vehicles are dangerously close to one another inviting collisions.

SUMMARY OF THE INVENTION

According to the present invention, a braking system for avoiding a collision of a vehicle with an obstacle ahead thereof comprises: a radar sensor mounted on the vehicle, producing a first and a second signal, the first signal representing a distance between the vehicle and the obstacle, and the second signal representing the relative velocity between the vehicle and the obstacle; a vehicle velocity sensor mounted on the vehicle, sensing the vehicle velocity to produce a third signal representing the same; a collision imminence computing unit connected to both the radar sensor and the vehicle velocity sensor for receiving the first, the second, and the third signals therefrom, generating, based on the received signals, a fourth and a fifth signal, the fourth signal representing a collision imminence with a stationary obstacle and the fifth signal representing a collision imminence with a moving obstacle; and two brake actuator driving circuits connected to the collision imminence computing unit, responding to the fourth and the fifth signals, respectively.

It is therefore an object of the present invention to provide an improved braking system for avoiding a collision of a vehicle with an obstacle ahead thereof.

Another object of the present invention is to provide such a system, which determines whether the obstacle is stationary or moving and generates suitable signals in order to properly control the braking of a vehicle.

BRIEF DESCRIPTION OF THE DRAWINGS

These and other objects, features and many of the attendant advantages of this invention will be appreciated more readily as the invention becomes better understood by the following detailed description, when considered in connection with the accompanying drawings, wherein.

DESCRIPTION OF THE PREFERRED EMBODIMENTS

Figure 1:
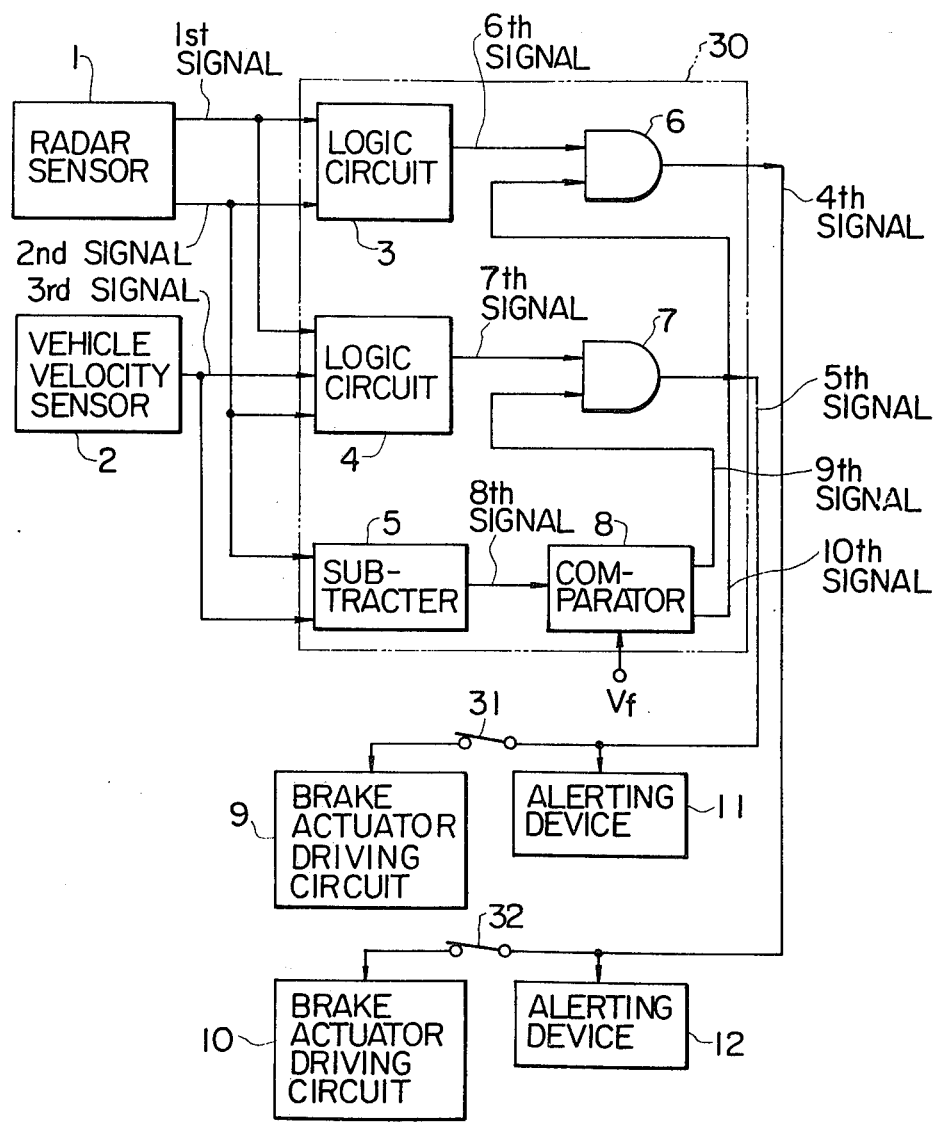
FIG. 1 is a block diagram showing a preferred embodiment of the present invention.

Reference is now made to FIG. 1, which is a block diagram illustrating a preferred embodiment of the present invention. A radar sensor 1 is mounted at the front of a vehicle (not shown) to emit a radar signal and then to receive the radar signal reflected by an obstacle (not shown, moving or otherwise) ahead of the vehicle, generating a first and a second signal therefrom. The first signal, the magnitude of which is denoted by a reference character R, represents a distance between the vehicle and the obstacle. On the other hand, the second signal, the magnitude of which is denoted by a reference character $V_r$, represents a relative velocity between the vehicle and the obstacle. These two signals are then fed to the next stage, viz., a logic circuit 3 of a collision imminence computing circuit 30. The logic circuit 3 generates, based on the first and the second signal, a sixth signal indicating a logic "1" therefrom when a collision of the vehicle with a stationary obstacle is imminent. The logic circuit 3 will be described in detail in connection with FIG. 2. The sixth signal is then fed to an AND gate 6 which receives a tenth signal from a comparator 8.

As shown, a vehicle velocity sensor 2 is mounted on the vehicle (not shown) to generate a third signal $V_a$ representing a vehicle velocity therefrom. As the vehicle velocity sensor, a conventional speedometer can be used. The third signal is then fed to another logic circuit 4 which also receives the first and the second signals from the radar sensor 1. The logic circuit 4 generates, based on the received three signals, a seventh signal indicating a logic "1" therefrom when a collision of the vehicle with a moving obstacle is imminent. The logic circuit 4 will be described later in detail in connection with FIG. 3. The seventh signal is then fed to an AND gate 7 which receives a ninth signal from the comparator 8.

A subtracter 5 receives the second signal from the radar sensor 1 and also receives the third signal from the vehicle velocity sensor 2, subtracting $V_r$ from $V_a$ and generating an eighth signal representative of the difference. The eighth signal is then fed to the comparator 8 to which a reference signal (no numeral) is also supplied. The reference signal, the magnitude of which is denoted by reference character $V_f$, represents a speed of, for example, 5 km/hour. The comparator 8 generates the ninth signal indicative of a logic "1" if the magnitude of the eighth signal is greater than $V_f$, and on the other hand, also generates the tenth signal indicative of a logic "1" if otherwise. The ninth and the tenth signals are fed to the AND gates 7 and 6, respectively. The purpose of the comparator 8 is to compensate for measuring errors of $V_a$ and $V_r$, which errors result from, for example, (1) when the vehicle travels a corner, and (2) yawing and/or nose diving of the vehicle brought about by varying road conditions, thereby to avoid malfunction of the braking system in question. In the present preferred embodiment, the reference signal is set to be 5 km/hour.

The AND gate 6 generates a fourth signal when the sixth signal coincides with the tenth signal. This means that a collision of the vehicle with the stationary obstacle is inevitably imminent. On the other hand, when the seventh signal coincides with the ninth signal, the AND gate 7 generates a fifth signal. This means that a collision of the vehicle with the moving obstacle (such as a preceding vehicle) is inevitably imminent. In the above, the fourth and the fifth signals are fed to suitable alerting devices 11 and 12 to alert the vehicle driver that the aforementioned collisions are imminent. The fourth and the fifth signals are also fed to brake actuator driving circuits 9 and 10 to automatically activate one or more brake actuators (not shown) through suitable switches 31 and 32, which the vehicle driver can switch off to manually brake the vehicle.

Figure 2:
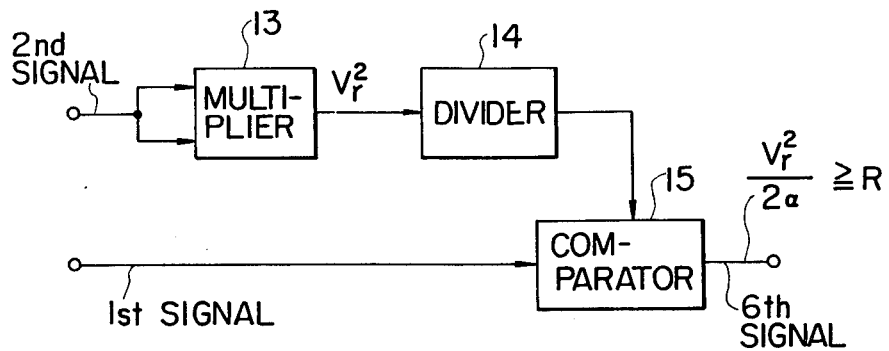
FIG. 2 is a block diagram showing a detail of an element of the embodiment of FIG. 1.

Reference is now made to FIG. 2, which is a block diagram showing a detail of the logic circuit 3 of the collision imminence computing circuit 30. A multiplier 13 is connected to the radar sensor 1 to receive the second signal therefrom, squaring the magnitude $V_r$ to generate a signal representing $V_r^2$. The signal from the multiplier 13 is then fed to a divider 14 which divides $V_r^2$ by $2\alpha$, wherein $\alpha$ is the deceleration of the vehicle and is previously determined. Thus, the divider 14 generates a signal representative of $V_r^2/2\alpha$, which is then fed to a comparator 15 to which the first signal is also applied from the radar sensor 1. The comparator 15 then compares the first signal and the signal from the divider 14, generating the sixth signal indicative of a logic "1" if the following formula is satisfied $$V_r^2/2\alpha \geq R \tag{1}$$

The above formula comes from the fact that a travelling distance which is required for the vehicle to be brought to a halt after start of braking, is determined by $V_a^2/2\alpha$. However, since, in this case, the stationary obstacle is discussed, the relative velocity $V_r$ is equal to the vehicle velocity $V_a$, so that we obtain the following equation:

$$V_a^2/2\alpha = V_r^2/2\alpha \tag{2}$$

As a result, the comparator 15 compares $V_r^2/2\alpha$ and R.

Figure 3:
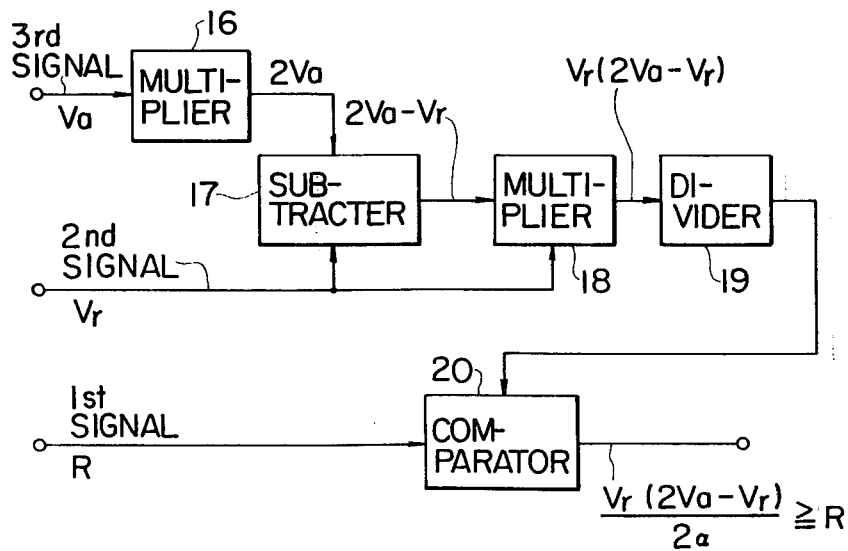
FIG. 3 is a block diagram showing a detail of an element of the preferred embodiment of FIG. 1.

Reference is now made to FIG. 3, which is a block diagram showing the detail of the logic circuit 4 of the collision imminence computing circuit 30 in FIG. 1. A multiplier 16 is connected to the vehicle velocity sensor 2 to receive the third signal therefrom, doubling the magnitude thereof, viz., $V_a$, and generating a signal representing $2V_a$ therefrom. The signal from the multiplier 16 is then fed to a subtracter 17 which also receives the first signal from the radar sensor 1 and which subtracts $V_r$ from $2V_a$ to generate a signal representing $2V_a - V_r$. The signal from the subtracter 17 is then fed to a multiplier 18 to which the second signal is fed from the radar sensor 1. Then the multiplier 18 multiplies the received two signals to generate a signal representing the product, that is, $V_r(2V_a - V_r)$, which signal is then fed to a divider 19. The divider 19 divides $V_r(2V_a - V_r)$ by $2\alpha$ to produce a signal representing $V_r(2V_a - V_r)/2\alpha$. The signal from the divider 19 is then fed to a comparator 20 to which the first signal is fed from the radar sensor 1. The comparator 20 compares the received two signals, generating the seventh signal indicating a logic "1" therefrom if the following formula is satisfied $$V_r(2V_a - V_r)/2\alpha \geq R \tag{3}$$

In the following, the reason for using the above formula will be described. It is now assumed that (1) the velocity of a preceding vehicles is $V_f$(m/sec), (2) the velocity of a following vehicle is $V_a$(m/sec), and (3) each of the decelerations of the following and preceding vehicle is $\gamma$(m/sec$^2$), then, a distance ($R_f$) required for the preceding vehicle to be brought to a halt after start of braking is equal to $V_f^2/2\gamma$, so that we obtain $$R_f = V_f^2/2\alpha \tag{4}$$

The distance (R) required for the following vehicle to be brought to a halt after start of braking is equal to $V_a/2\gamma$, so that we obtain $$R = V_a/2\alpha \tag{5}$$

Therefore, if R is assumed to be a minimum distance, between the preceding and the following vehicles, required for the following vehicle not to collide with the preceding vehicle, at least the following equation should be satisfied $$R_f + R = V_a^2/2\alpha \tag{6}$$

Substituting the equation (4) into (6) gives $$R = (1/2\alpha)(V_a^2 - V_f^2) \tag{7}$$

Since the relative velocity $V_r$ is equal to the difference between the velocity of the following vehicle $V_a$ and the velocity of the preceding vehicle $V_f$, we obtain $$V_r = V_a - V_f \tag{8}$$

Substituting the equation (8) into (7) gives $$R = (1/2\alpha) V_r(2V_a - V_r) \tag{9}$$

Therefore, it is understood that the comparator 20 generates the seventh signal indicating a logic "1" if the right of the equation is equal to or greater than the left thereof as previously referred to.

It is therefore apparent from the foregoing that, according to the preferred embodiment of the present invention, proper braking a vehicle can be automatically or manually carried out depending upon whether an obstacle ahead of the vehicle is stational or moving, whereby a collision of the vehicle with the obstacle can be avoided.

What is claimed is:

1. A braking system for avoiding a collision of a travelling vehicle with an obstacle ahead thereof, comprising:

radar means mounted in use on a vehicle for emitting a radar signal forwardly;

a radar sensor mounted on the vehicle for producing a first and a second signal, the first signal representing a distance between the vehicle and an obstacle, and the second signal representing the relative velocity between the vehicle and the obstacle;

a vehicle velocity sensor mounted on the vehicle, sensing the vehicle velocity to produce a third signal representing the same;

first means connected to the radar sensor for receiving the first and the second signal therefrom, generating, based on the received signals, a sixth signal if the following formula is satisfied, $$V_r^2/2\alpha \geq R$$

where $V_r$: is the relative velocity
$\alpha$: is the deceleration of the vehicle
$R$: is the distance between the vehicle and the obstacle;

second means connected to both the radar sensor and the vehicle velocity sensor for receiving the first, the second, and the third signal therefrom, for generating, based on the received signals, a seventh signal if the following formula is satisfied, $$V_r(2V_a-V_r)/2\alpha \geq R$$

where $V_a$: the vehicle velocity;

third means connected to both the radar sensor and the vehicle velocity sensor for receiving the second and the third signals therefrom, for generating, based on the received signals, an eighth signal representing the difference between the vehicle velocity and the relative velocity;

a comparator connected to the third means for receiving the eighth signal therefrom, generating a ninth signal if the magnitude of the eighth signal is greater than that of the ninth signal, and generating a tenth signal if the magnitude of the eighth signal is smaller than that of the ninth signal;

a first AND gate connected to both the first means and the comparator for receiving the sixth and the tenth signal therefrom, for generating a fourth signal if the sixth signal coincides with the tenth signal, the fourth signal representing a collision imminence with a stationary obstacle;

a second AND gate connected to the second means and the comparator for receiving the seventh and the ninth signals therefrom, for generating a fifth signal if the seventh signal coincides with the ninth signal, the fifth signal representing a collision imminence with a moving obstacle; and two brake actuator driving circuits connected to the collision imminence computing unit, responding to the fourth and the fifth signals, respectively.

2. A braking system as claimed in claim 1, further comprising:

two alerting systems connected to the collision imminence unit to receive the fourth and the fifth signal, for alerting the vehicle driver of the collision imminences, respectively; and two electrical switches each provided between one of the first and second AND gates and one of the two brake actuator driving circuits.

3. A braking system for avoiding a collision of a vehicle with an obstacle ahead thereof, comprising:

a radar sensor mounted on the vehicle, for producing a first and a second signal, the first signal representing a distance between the vehicle and the obstacle, and the second signal representing the relative velocity between the vehicle and the obstacle;

a vehicle velocity sensor mounted on the vehicle, sensing the vehicle velocity to produce a third signal representing the same;

a collision imminence computing unit connected to both the radar sensor and the vehicle velocity sensor for receiving the first, the second, and the third signal therefrom, for generating, based on the received signals, a fourth and a fifth signal, the fourth signal representing a collision imminence with a stational obstacle and the fifth signal representing a collision imminence with a moving obstacle;

two brake actuator driving circuits connected to the collision imminence computing unit, responding to the fourth and the fifth signal, respectively; the collision imminence computing unit comprising:

first means connected to the radar sensor for receiving the first and the second signal therefrom, for generating, based on the received signals, a sixth signal if the following formula is satisfied $$V_r^2/2\alpha \geq R$$

where $V_r$: is the relative velocity
$\alpha$: is the deceleration of the vehicle
$R$: is the distance between the vehicle and the obstacle;

second means connected to both the radar sensor and the vehicle velocity sensor for receiving the first, the second, and the third signal therefrom, for generating, based on the received signals, a seventh signal if the following formula is satisfied $$V_r(2V_a-V_r)/2\alpha \geq R$$

wherein $V_a$: is the vehicle velocity;

third means connected to both the radar sensor and the vehicle velocity sensor for receiving the second and the third signal therefrom, for generating, based on the received signals, an eighth signal representing the difference between the vehicle velocity and the relative velocity;

a comparator connected to the third means for receiving the eighth signal therefrom, for generating a ninth signal if the magnitude of the eighth signal is greater than that of the ninth signal, and for generating a tenth signal if the magnitude of the eighth signal is smaller than that of the ninth signal;

a first AND gate connected to both the first means and the comparator for receiving the sixth and the tenth signal therefrom, for generating a fourth signal if the sixth signal coincides with the tenth signal; and a second AND gate connected to the second means and the comparator for receiving the seventh and the ninth signal therefrom, for generating the fifth signal if the seventh signal coincides with the ninth signal.

4. A braking system as claimed in claim 3, wherein the first means comprises:

a multiplier connected to the radar sensor for receiving the first signal, for multiplying the magnitude of the same two times and for generating a signal representing the product;

a divider connected to the multiplier for receiving the signal therefrom, for dividing the magnitude of the received signal by the square of the deceleration of the vehicle; and a comparator connected to the radar sensor for receiving the first signal therefrom and also connected to the divider for receiving the signal therefrom, for comparing the magnitudes of the two received signals and generating the sixth signal if the magnitude of the former is equal to or greater than that of the latter.

5. A braking system as claimed in claim 3, wherein the second means comprises:

a first multiplier connected to the vehicle sensor for receiving the third signal therefrom, for doubling the magnitude thereof and for generating a signal representing the product;

a subtractor connected to the radar sensor for receiving the second signal therefrom and also connected to the multiplier for receiving the signal therefrom, for subtracting the magnitude of the latter signal from that of the second signal, and for generating a signal representing the difference;

a second multiplier connected to the subtractor for receiving the signal therefrom and also connected to the radar sensor for receiving the second signal therefrom, for multiplying the magnitudes of the received two signals, and for generating a signal representing the product;

a divider connected to the multiplier for receiving the signal therefrom, dividing the magnitude of the received signal by twice the deceleration of the vehicle; and a comparator connected to the divider for receiving the signal therefrom and also connected to the radar sensor for receiving the first signal therefrom, for comparing the magnitudes of the two received signals, and for generating the fifth signal if the magnitude of the former is equal to or greater than that of the latter.

* * * * *